(12) United States Patent
Durand et al.

(10) Patent No.: US 7,140,530 B2
(45) Date of Patent: *Nov. 28, 2006

(54) METHOD FOR JOINING AXLE COMPONENTS

(75) Inventors: Robert Durand, Lancaster, PA (US); James A. Duggan, Temperance, MI (US)

(73) Assignee: Dana Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,109

(22) Filed: Nov. 16, 2004

(65) Prior Publication Data

US 2006/0032895 A1 Feb. 16, 2006

Related U.S. Application Data

(63) Continuation-in-part of application No. 10/319,635, filed on Dec. 16, 2002, now Pat. No. 6,817,511.

(51) Int. Cl.
*B23K 31/02* (2006.01)

(52) U.S. Cl. ............... 228/234.1; 228/235.1; 228/115; 29/506; 29/897.2

(58) Field of Classification Search ............ 228/234.1, 228/115, 235.1; 29/508, 897.2
See application file for complete search history.

(56) References Cited

U.S. PATENT DOCUMENTS

| | | | |
|---|---|---|---|
| 3,436,806 A | 4/1969 | Supan | |
| 3,520,049 A | 7/1970 | Lysenko et al. | |
| 3,751,021 A | 8/1973 | Foster | |
| 4,067,216 A | 1/1978 | Khimenko et al. | |
| 4,504,714 A | 3/1985 | Katzenstein | |
| 4,513,188 A * | 4/1985 | Katzenstein | 219/617 |
| 4,513,488 A | 4/1985 | Arena | |
| 4,807,351 A | 2/1989 | Berg et al. | |
| 5,800,024 A | 9/1998 | Steimmel et al. | |
| 5,966,813 A | 10/1999 | Durand | |
| 5,981,921 A | 11/1999 | Yablochnikov | |
| 6,234,375 B1 * | 5/2001 | Durand | 228/115 |
| 6,474,534 B1 | 11/2002 | Gabbianelli et al. | |
| 6,477,774 B1 | 11/2002 | Marando et al. | |
| 6,510,920 B1 | 1/2003 | Durand | |

(Continued)

FOREIGN PATENT DOCUMENTS

EP 1188644 A1 3/2002

(Continued)

OTHER PUBLICATIONS

Derwent-Acc-No: 2004-073078, no date available.

*Primary Examiner*—Jonathan Johnson
*Assistant Examiner*—Rachel E. Beveridge
(74) *Attorney, Agent, or Firm*—Berenato, White & Stavish

(57) ABSTRACT

A method of joining two vehicle axle housing components made from the same or dissimilar materials includes providing a first axle housing component, and providing a second axle housing component, where one of the first and second axle housing components is a metallic component made of a metallic material. A portion of one of the first and second axle housing components is positioned within a portion of the other of the axle housing components in an overlapping manner, thereby forming an overlapping portion. A metallic band may be disposed around the overlapping portion. An inductor is positioned around the overlapping portion. The inductor is energized to generate a magnetic field for collapsing at least one of the overlapping portion and the metallic band, thereby securing the first and second axle housing components together.

43 Claims, 10 Drawing Sheets

U.S. PATENT DOCUMENTS

| | | | |
|---|---|---|---|
| 6,548,792 B1 * | 4/2003 | Durand | 219/617 |
| 6,860,013 B1 * | 3/2005 | Durand | 29/897.2 |
| 6,908,023 B1 * | 6/2005 | Yablochnikov | 228/115 |
| 6,921,013 B1 * | 7/2005 | Kichline et al. | 228/115 |
| 6,977,361 B1 * | 12/2005 | Durand | 219/617 |
| 2002/0003159 A1 | 1/2002 | Gabbianelli et al. | |
| 2003/0127453 A1 | 7/2003 | Kichline | |
| 2003/0192880 A1 | 10/2003 | Yablochnikov | |

FOREIGN PATENT DOCUMENTS

| | | |
|---|---|---|
| JP | 357009586 A | 1/1982 |
| JP | 405254460 A | 10/1993 |
| WO | WO 97/00595 | 1/1997 |

* cited by examiner

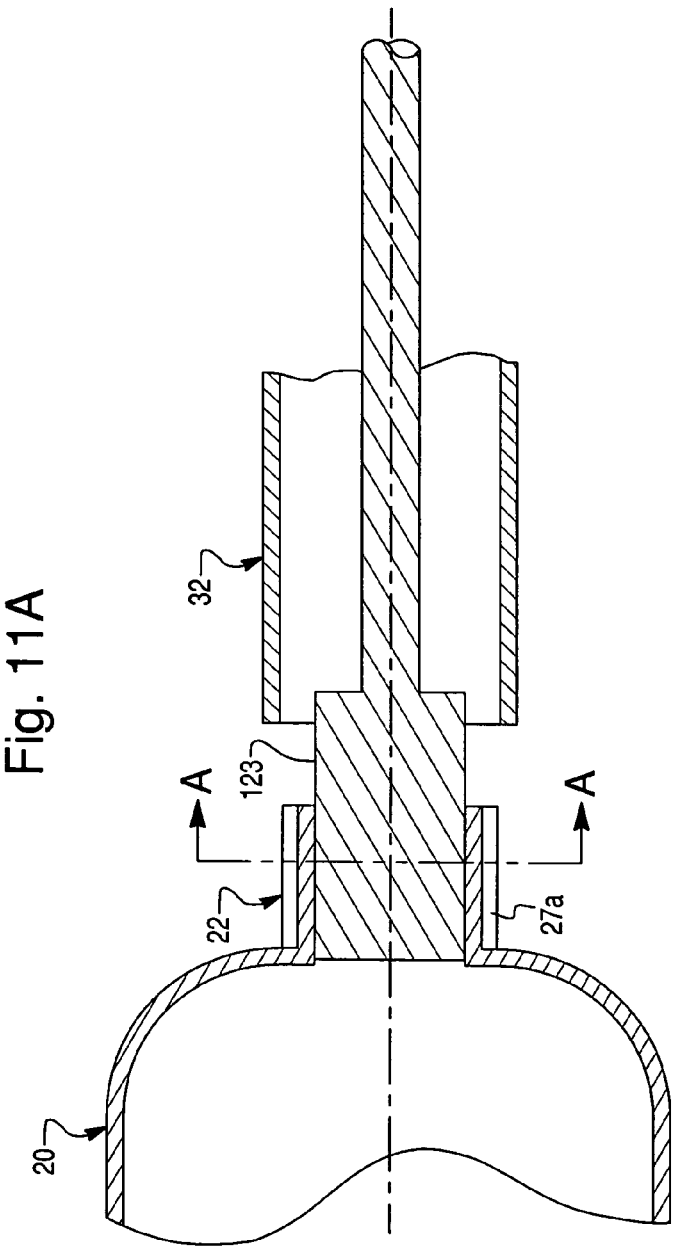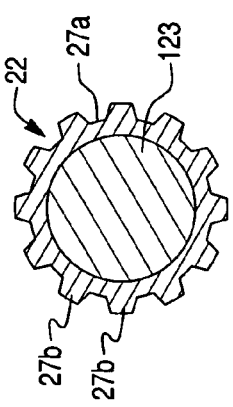

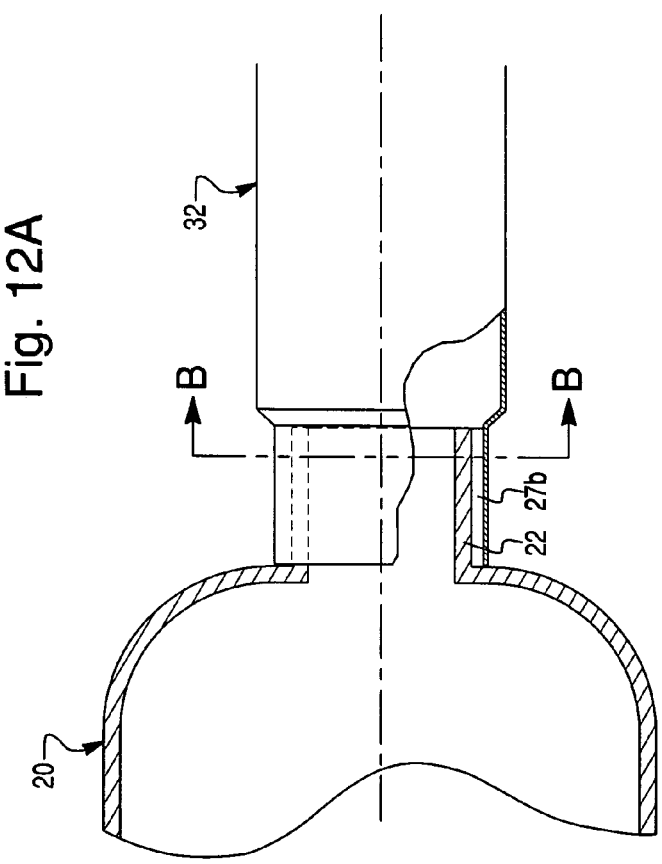
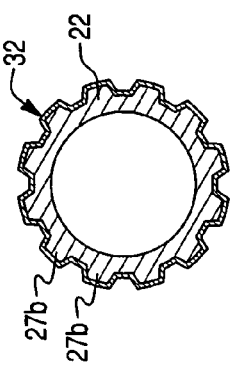

METHOD FOR JOINING AXLE COMPONENTS

CROSS-REFERENCE TO RELATED APPLICATION

This application is a continuation-in-part of application Ser. No. 10/319,635, filed Dec. 16, 2002 now U.S. Pat. No. 6,817,511.

BACKGROUND OF THE INVENTION

1. Field of the Invention

This invention relates in general to vehicular axle assemblies and in particular to a method for joining together vehicle components, especially those manufactured from dissimilar materials, to form such a vehicle axle assembly.

2. Background of the Invention

Axle assemblies are well known structures that are in common use in most vehicles.

Such axle assemblies include a number of components, which are adapted to transmit rotational power from an engine of the vehicle to the wheels thereof. Typically, an axle assembly includes a differential assembly that is rotatably supported within a non-rotating carrier. The differential is connected between an input drive shaft extending from the vehicle engine/transmission and a pair of output axle shafts extending to the vehicle wheels. The axle shafts are contained in respective non-rotating beam portions, which are secured to the carrier. Thus, rotation of the differential by the drive shaft causes corresponding rotation of the axle shafts. The carrier and the beam portions form an axle housing for these drive train components of the axle assembly, inasmuch as the differential and the axle shafts are supported for rotation therein.

Axle housings are generally classified into two basic types. The first axle housing type is a unitized carrier construction, commonly referred to as a Salisbury or Spicer type axle assembly. In this structure, the carrier (which houses the differential assembly) is directly connected to the two beam portions (which house the rotatable axle shafts). An opening is provided at the rear of the carrier to permit assembly of the differential therein. A cover closes this opening during use. Unitized carrier axle housing constructions of this type are economical to manufacture and are readily adaptable for a variety of vehicles.

The second axle housing type is a separable carrier construction. In this structure, the axle beam portions are connected together by a central portion of the axle housing that is formed separate and apart from the differential carrier. This central portion is generally hollow and cylindrical in shape, having a large generally circular opening formed therethrough. During assembly, the differential is first assembled within the carrier, then the carrier is secured to the central member. The overall shape of this type of axle housing (i.e., the generally round shape of the central portion and the elongated beam portions extending therefrom) generally resembles the shape of a banjo musical instrument. Hence, this type of axle housing is commonly referred to as a banjo type axle housing. Banjo type axle housings are advantageous because the carrier and differential can be removed from the axle assembly for service without disturbing the other components thereof. In addition, the beaming loads of the vehicle weight are carried via a separate structure from that structure which orients and rotatably supports the differential assembly and the ring and pinion set. Because of this separation of function, banjo-style axles will support higher vehicle weights than a Salisbury-style axle assembly of similar size.

In the past, several methods have been employed to form axle housings, and many of these methods employ welding to form the housing.

In the past, virtually all of these axle assemblies have been manufactured from a metallic material. Steel has traditionally been the preferred material for manufacturing all of such vehicle axle components because of its relatively high strength, relatively low cost, and ease of manufacture. As mentioned above, vehicle axle housing assemblies manufactured from metallic materials have been secured together by conventional welding techniques. More recently, however, in an effort to reduce the weight of the vehicle axle assembly, it has been found desirable to use alternative materials to form some or all of the vehicle axle components. Thus, in some instances, it may be desirable to form some or all of the vehicle axle components from materials which cannot be easily secured together, or in some cases cannot be secured together at all by conventional welding techniques. For example, conventional welding techniques cannot be used to secure a metallic vehicle axle component to another non-metallic vehicle axle component. Thus, it would be desirable to provide a method for joining vehicle components together to form a vehicle axle assembly, where the components are formed from alternative materials, and particularly those components manufactured from dissimilar materials, such as cast iron or aluminum carrier housings and fiber-reinforced composite tubes.

SUMMARY OF THE INVENTION

The above object as well as other objects not specifically enumerated are achieved by a method of joining axle housing components made from dissimilar materials, where the method includes providing a central carrier component, and providing a pair of hollow arm portions preferably made from a material which is dissimilar to the material used to make the carrier component. Thereafter, the arm portions are secured to the central carrier component using magnetic pulse welding or forming techniques.

For example, where two generally conductive metallic components of similar or dissimilar material constitute the axle housing, a portion of one of the axle housing components may be positioned within a portion of the other of the components in an overlapping manner, thereby forming an overlapping portion. An inductor is positioned around the outer metallic component. The inductor is energized to generate a magnetic field for collapsing the outer and overlapping portion at a velocity sufficiently developed by an electromagnetic pulse to weld the outer and inner metallic components to each other, thereby securing the axle housing components together. Alternatively, the inductor may be energized with a lower voltage to generate a magnetic field sufficient for collapsing the outer and overlapping portion at a velocity suitable for crimping the axle housing components together, but not sufficient to create metallurgic bond therebetween.

In another embodiment of the invention, the method of joining two axle housing components made from dissimilar materials where the outer member is both dissimilar and less or non-conductive, the process includes the steps of providing a first axle housing component of a metallic material, providing a second axle housing component made from a composite or non-conductive dissimilar material, and positioning a portion of the first axle component within a portion of the second axle component in an overlapping manner, thereby forming an overlapping portion, where the protrusion is within the overlapping portion. A conductive metallic band (termed a "driver ring") is disposed around the overlapping portion, and an inductor is disposed around the metallic band. The inductor is energized to generate a magnetic field for collapsing the band about the overlapping portion at a velocity sufficiently developed by an electromagnetic pulse to weld the outer band and inner metallic component to each other, thereby securing the first and second axle housing components together, wherein the metallic band is also crimped over the protrusion securing the composite or non-conductive component to the inner metallic housing. Again alternatively, the inductor may be energized with a lower voltage to generate a magnetic field sufficient for collapsing the metallic band at a velocity suitable for crimping the axle housing components together, but not sufficient to create metallurgic bond therebetween.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 11A and 11B show axle components before crimping operation.

FIGS. 12A and 12B show the axle components after crimping operation.

DETAILED DESCRIPTION OF THE PREFERRED EMBODIMENT

Figure 1:
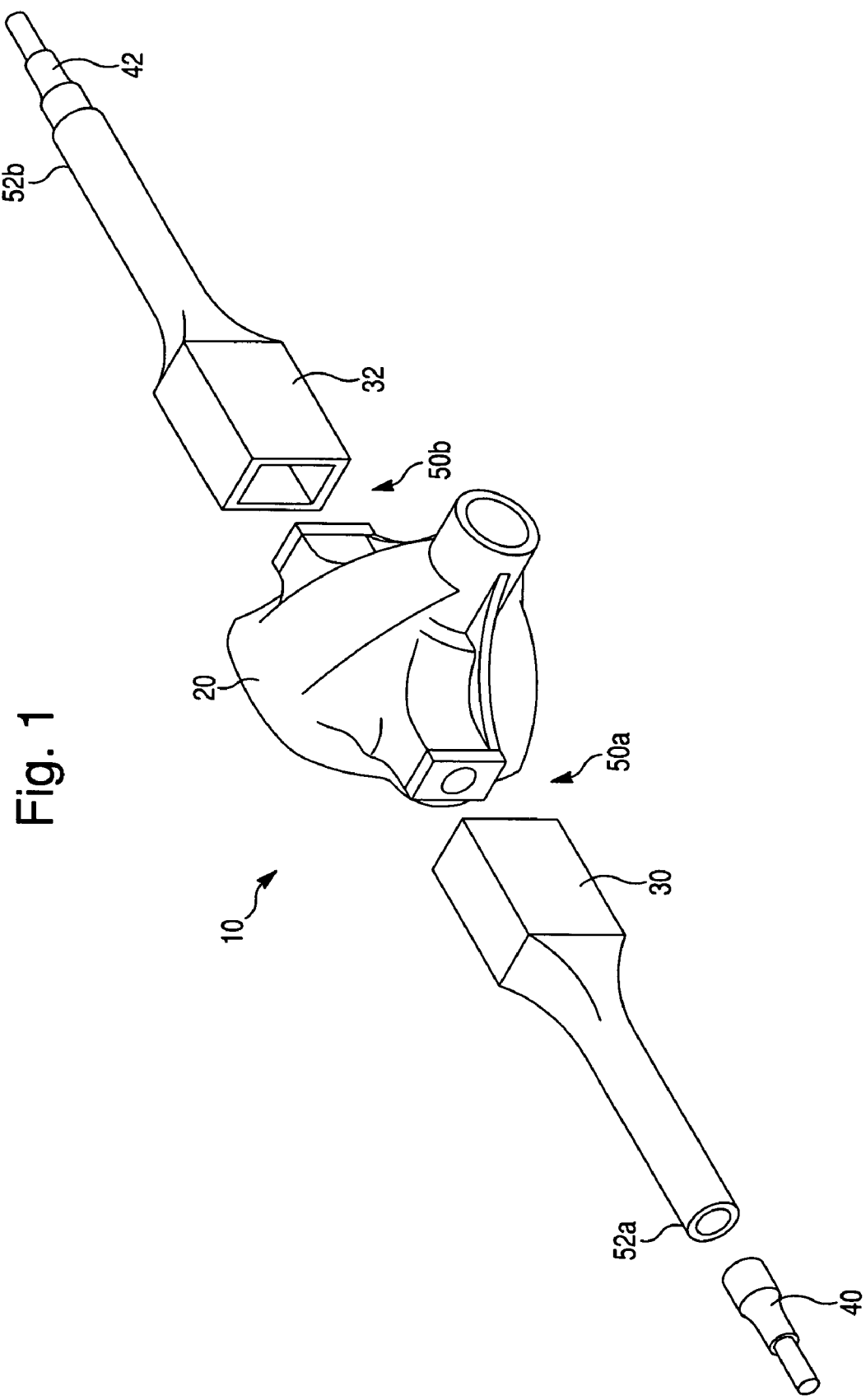
FIG. 1 is a schematic perspective exploded view of a vehicle axle assembly manufactured in accordance with a method of this invention.

Referring now to the drawings, there is schematically illustrated in FIG. 1 a vehicle axle housing assembly, indicated generally at 10, to be manufactured in accordance with the method of this invention. The illustrated vehicle axle housing assembly 10 is a three-piece assembly. However, it will be appreciated that the method of this invention may be utilized in the manufacture of any type of vehicle axle housing assembly, such as a banjo-type assembly where the structural components include a central carrier housing and a pair of axle arms combined into an integral unit.

The illustrated axle housing assembly 10 includes a hollow central carrier portion 20 and a pair of hollow arm portions 30, 32 extending laterally therefrom. The central carrier portion 20 is adapted to rotatably support a differential therein, while the arm portions 30, 32 are adapted to rotatably support a pair of axle shafts extending laterally from the differential. Typically, wheel spindles 40, 42 are provided at the ends of each of the arm portions. The wheel spindles 40, 42 rotatably support the wheels of the vehicle on the axle housing, while allowing the axle shafts to extend therethrough to rotatably drive the wheels. These components 20, 30, 32, 40, 42 can be formed having any desired structure taking into account the special features described below, as is well known to those skilled in the art and may be formed from any desired material. Preferably, the central carrier portion 20 is formed of cast iron, aluminum or steel, and the hollow arm portions 30, 32 may be hydroformed aluminum or other suitable materials, anticipating both metallic and non-metallic varieties. The method used to shape said arms is illustrative only and would be understood as such by those skilled in the art. The spindles 40, 40 are typically made of steel, but this invention should not be limited in any way to a specific material for these components.

In the illustrated embodiment, both the central carrier portion 20 and the hollow arm portions 30, 32 are shown as closed channel structures, although the method of the invention can be used with channel structures of other configurations. Closed channel structural members can be characterized as having a continuous cross sectional shape, such as circular, tubular or box-shaped channel members, for example. In contrast, open channel structural members can be characterized as having a non-continuous cross sectional shape, such as C-shaped or hat-shaped channel members, for example. Such open channel structural members are relatively easy and inexpensive to shape into desired configurations and to secure together. Closed channel structural members are desirable because they are generally stronger and more rigid than open channel structural members of comparable weight.

In a first exemplary embodiment of this invention, the axle housing members to be joined are both made from different metallic materials. For example, the center carrier portion 20 can be formed from aluminum or steel, the arm portions 30, 32 can be formed from aluminum, and the wheel spindles can be formed from steel. It is also envisioned that one of the two vehicle axle housing components, for example one of the carrier portion 20 or the arm portions 30, 32 to be joined together at a joint is made from a non-metallic material, while the other component is made from a metallic material. Thus, the illustrated joints 50a, 50b connect a metallic axle component to a non-metallic component. However, the method of this invention is equally suitable to form a joint 50a, 50b between two axle components made from any two dissimilar materials, even where the two dissimilar materials are generally not joinable by conventional techniques. As such, the inventive method may be used to join two axle components made from dissimilar metals or to join two axle components made from one metallic material and another, different non-metallic (or non-weldable) material.

Figure 2:
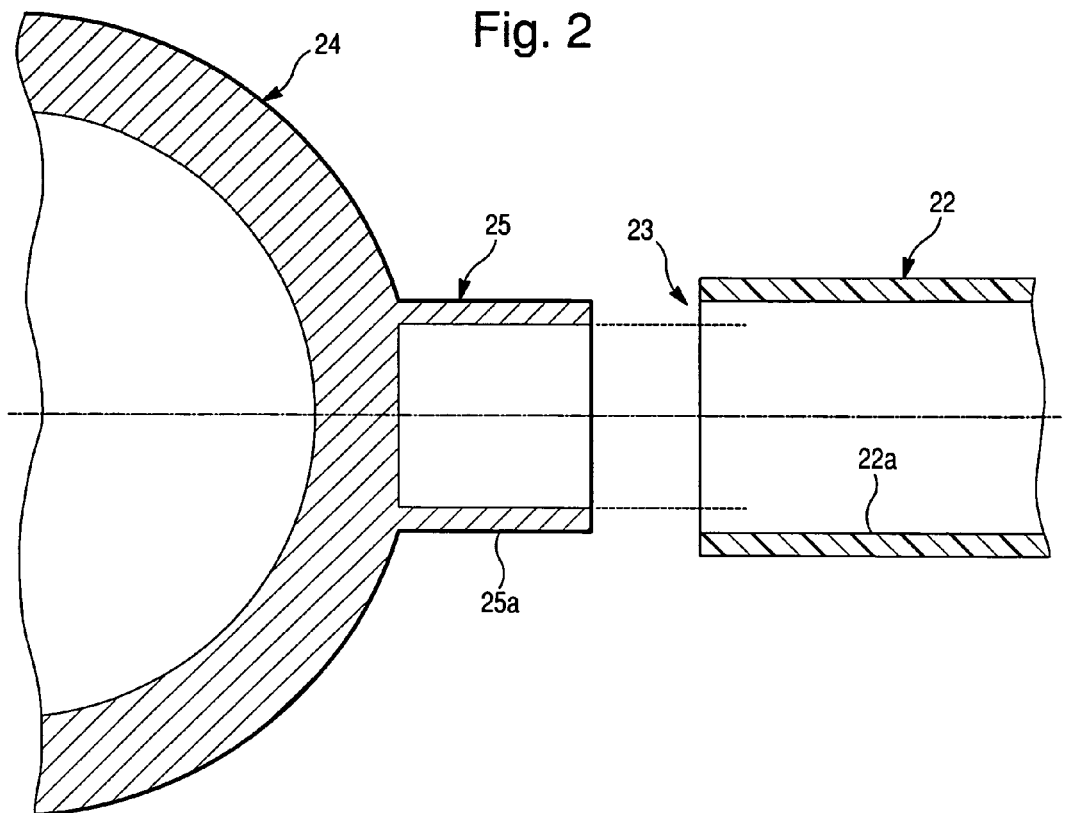
FIGS. 2 and 3 are enlarged cross-sectional views in elevation of a portion of the vehicle axle assembly illustrated in FIG. 1 sequentially illustrating the steps in a first exemplary embodiment of the method for securing axle components in accordance with this invention.
Figure 3:
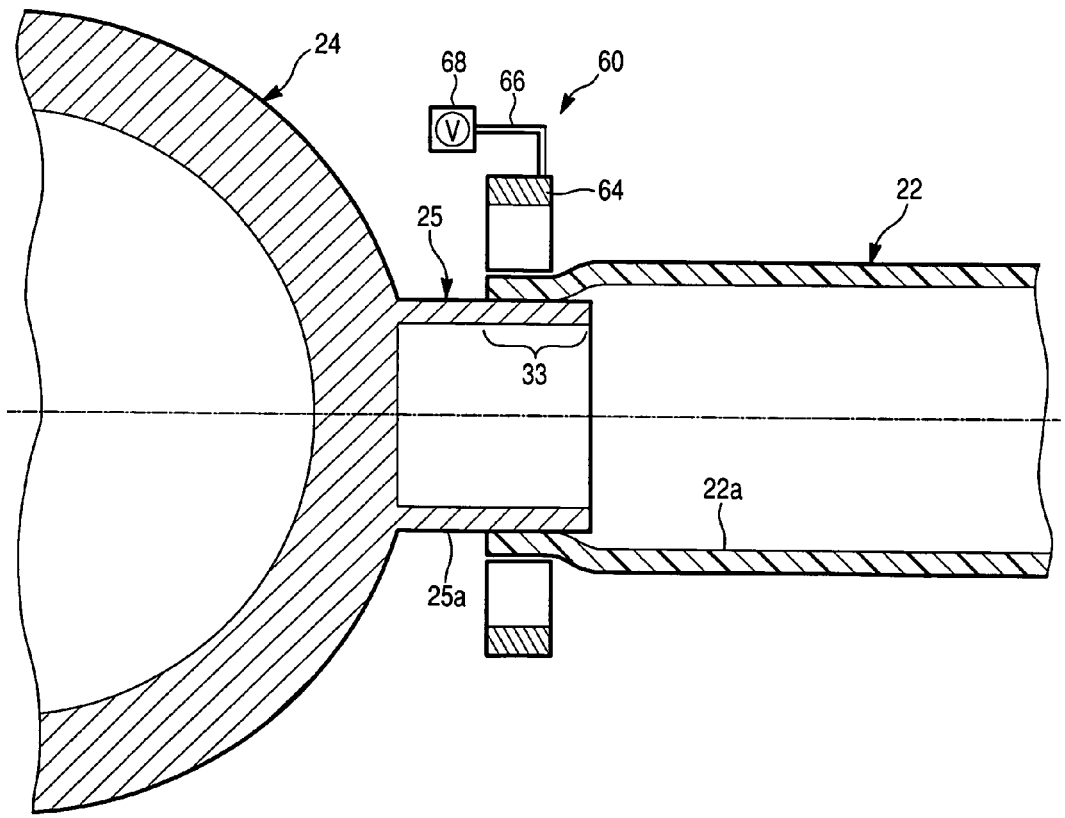
Figure 4:
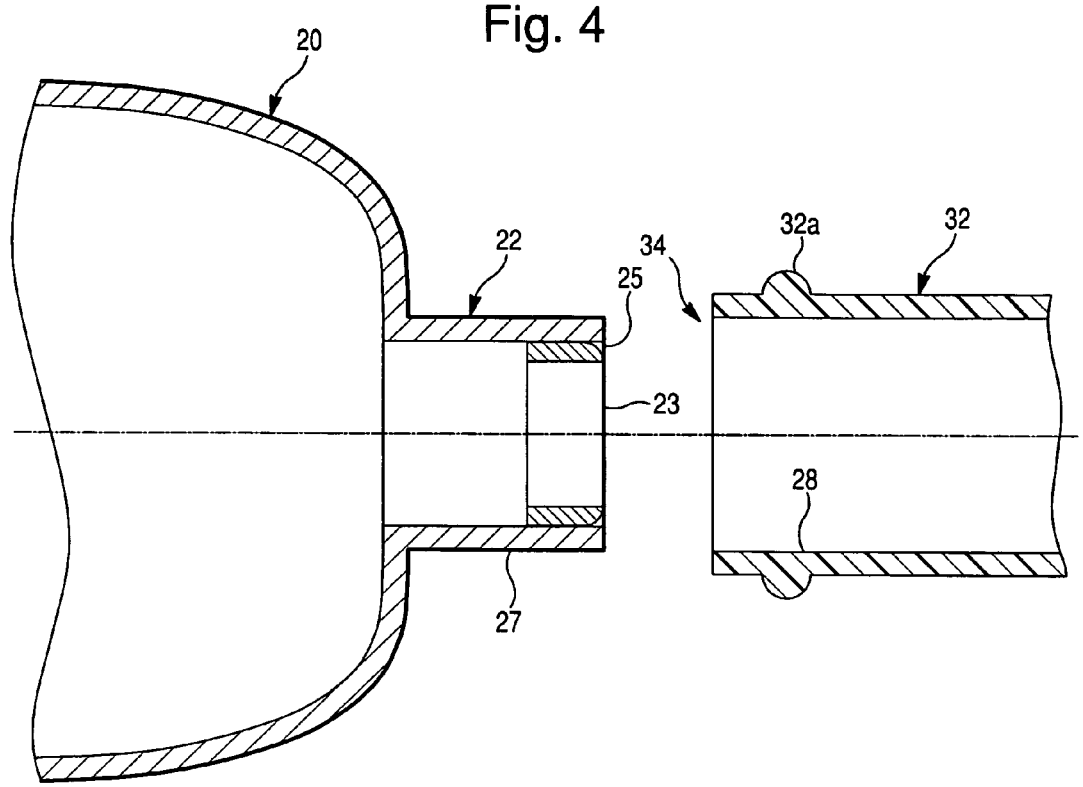
FIGS. 4 through 7 are enlarged cross-sectional views in elevation of a portion of the vehicle axle assembly illustrated in FIG. 1 sequentially illustrating the steps in a second exemplary embodiment of the method for securing axle components in accordance with this invention.

The method for joining two vehicle axle components made from dissimilar materials in accordance with this invention is shown in FIGS. 2 through 7. A first exemplary method is illustrated in FIGS. 2 and 3, a second exemplary method is shown in FIGS. 4–7, and a third exemplary method is shown in FIGS. 8–11.

In a first step of the method shown in FIG. 2, a metallic carrier member 20 and a non-metallic arm portion 32 are provided. In the illustrated embodiment, both the carrier-member 20 and the arm portion 32 are shown as closed channel structures, although such is not required. Metallic materials suitable for use in a vehicle axle assembly include, but are not limited to, cast iron, steel, aluminum, magnesium, and alloys thereof. Non-metallic material suitable for use in a vehicle axle component include, but are not limited to plastics, layered composites, fiber matrix composites (such as an aramid/glass/carbon composite), or combinations thereof. Other non-metallic materials include reinforced inorganic composite materials and laminate materials. For purposes of this invention, all of these non-metallic materials are referred to as "composite materials".

Figure 14:
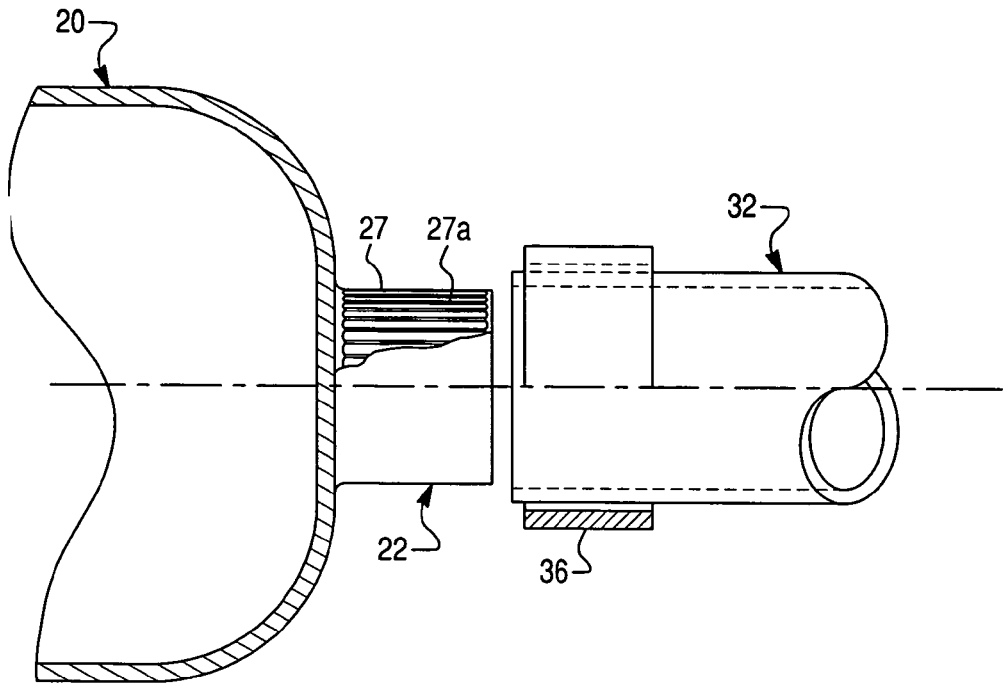
FIG. 14 shows the axle components in a fourth exemplary embodiment of the method in accordance with this invention before crimping operation.

The carrier portion 20 includes a flange 22 or other portion which extends from the carrier 20 at a location where it is desired to attach the arm portion 32. The flange 22 is adapted to be received within a portion of the arm portion, such as open end 34. The cross sectional shape of the flange 22 should be compatible with the cross sectional shape of the arm portion 32 of sufficient geometry to permit a magnetic pulse in the configuration where generally conductive materials are involved. Further, when the material of the outer component is composite, the perimeter of the outer surface 27 of the flange 22 will be only slightly smaller than the perimeter of the inner surface 28 of the arm portion 32 so that the cross member composite material will be supported on the 22 flange of portion 27 during and after the magnetic pulse welding. In the event of a composite tube, 32, the overlapping sections will be in an interference of press fit relationship. The loose fitting ring, 36, depicted in FIG. 14 is preferably made of aluminum and is the "flier" piece which deforms when subjected to the Magentic Pulse forming field. In a preferred embodiment, both the flange 22 and the arm portion 32 have a generally tubular rectangular or otherwise continuous cross section.

The second step in the method of this invention, as illustrated in FIG. 3, is to position the open end 34 of the arm portion 32 on the flange 22 such that a portion of the inner surface 28 of the arm portion 32 overlaps and contacts a portion of the outer surface 27 of the flange 22. The overlapping portion is indicated at 33.

The third step in the method of this invention is illustrated in FIG. 3. As shown, a perimeter reduction device, such as magnetic pulse welding (or forming) apparatus indicated generally at 60, is disposed around and adjacent the overlapping portion 33 of the arm portion 32 and flange 27. The magnetic pulse welding apparatus 60 includes leads or terminals 66 that connect a source of power 68 to the inductor coil 64. The electromagnetic pulse apparatus 60 is adapted to generate an intense, momentary magnetic field on a localized portion of the overlapping portion 33. The intense magnetic field applied at a localized area creates inwardly directed forces which cause the arm portion 32 to collapse inwardly at that area, thereby reducing its size until it intimately contacts the flange 27 and is magnetically pulse welded to the flange 27. The contact of the two members at high velocities from appropriately defined initial geometry causes the two members to be welded together.

The magnetic pulse apparatus 60 includes leads or terminals 66 that connect a source of power 68 to the inductor coils at 62 and 64. The magnetic pulse welding apparatus 60 includes one or more high voltage capacitors (not shown) and a discharge circuit (not shown) that is suitable for conducting a momentary current of sufficient magnitude. The central components of a magnetic pulse welding apparatus are its capacitor bank, inductor and high current switching device. The current required to successfully deform and weld on a hollow metallic member used in a vehicle axle component, such as the arm portion 32, may exceed one million amps, and will vary with the charge voltage of the power supply of 60, materials selected for components of the axle assembly and gauge thickness. The discharge circuit and the capacitors operate to supply an energy spike or surge to the inductor coils 62 and 64. The inductor coils 62 and 64 create a strong magnetic field that exerts a force against the outer surface of the band 36. The effect of the intense, momentary magnetic field on the axle housing components is to create an extremely powerful force that repels or drives the arm portion 32 radially inwardly away from the inductor coils 62 and 64. The magnetic field created by the pulse of current through the inductor coil 62 and 64 creates strong reactive eddy currents in the metallic arm portion 32. The eddy currents create opposing magnetic fields of the same pole that result in inwardly directed forces on the metallic arm portion 32. These forces cause the arm portion 32 to collapse about a localized area, reducing its size until it contacts the flange 27, thereby crimping or clinching and/or magnetically pulse welding the arm portion 32 to the flange 22 of the carrier portion 20.

A second exemplary embodiment of the method of joining of the axle components is shown in FIGS. 4–7. In a first step of the method shown in FIG. 4, a metallic carrier member 20 and a non-metallic arm portion 32 are provided. In the illustrated embodiment, both the carrier member 20 and the arm portion 32 are shown as closed channel structures, although such is not required. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The carrier portion 20 includes a flange 22 or other portion which extends from the carrier 20 at a location where it is desired to attach the arm portion 30, 32. In some light axle applications (i.e., gauge of material is less than 2.5 mm), an insert 23 might be used to provide the rigidity and stiffness necessary for a successful magnetic pulse welding process. The insert 23, if required, must be intimate with the outer supported component but does not have to be welded. The flange 22 is adapted to be received within a portion of the arm portion, such as open end 34. The cross sectional shape of the flange 22 should be compatible with the cross sectional shape of the arm portion 32 of sufficient geometry to permit a magnetic pulse weld in the configuration where generally conductive materials are involved. Further, when the material of the outer component is composite, the perimeter of the outer surface 27 of the flange 22 will be only slightly smaller than the perimeter of the inner surface 28 of the arm portion 32 so that the cross member composite material will be supported on the 22 flange of portion 27 during and after the magnetic pulse welding. In a preferred embodiment, both the flange 22 and the arm portion 32 have a generally tubular rectangular or otherwise continuous cross section.

In the illustrated embodiment, the arm portion 32 includes a protrusion 32a disposed on its outer surface. As shown therein, the protrusion 32a has a generally, semi-circular cross section, although this is not required. The protrusion 32a may extend around the entire perimeter of the outer surface of the arm portion 32, or only a portion thereof. In addition, one or more rows of protrusions 32a may be positioned on the outer surface of the arm portion 32 along its axial length.

Figure 5:
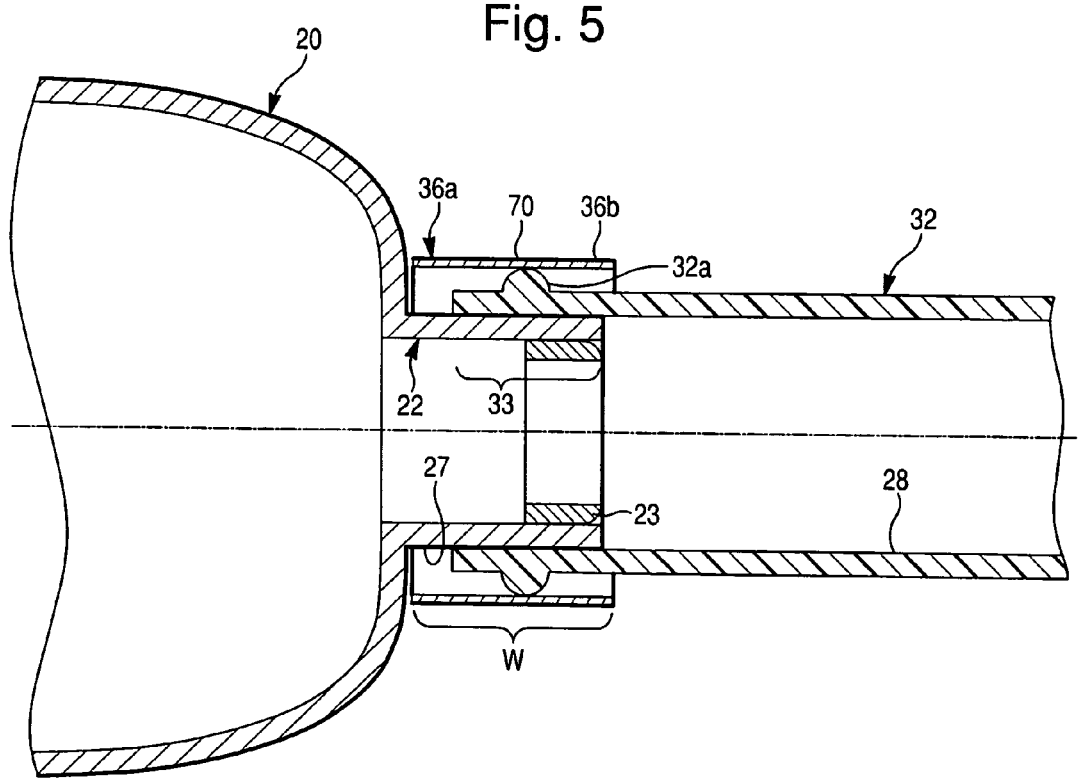

The second step in the method of this invention, as illustrated in FIG. 5, is to position the open end 34 of the arm portion 32 on the flange 22 such that a portion of the inner surface 28 of the arm portion 32 overlaps and contacts a portion of the outer surface 27 of the flange 22. The overlapping portion is indicated at 33. Next, a metallic band 36 is disposed completely around the overlapping portions of the arm portion 32 and the flange 27. The metallic band 36 is a continuous, annular-shaped member of good electrically conductive material, such as but not restricted to aluminum. The metallic band 36 has a width W sufficient to extend across the width of the protrusion 32a and the overlapping portion sufficient to be welded to flange 27. The band is provided with two edge portions 36a, 36b that are aligned on either sides of the protrusion. The edge portions are adapted to contact the flange 27 and the arm portion 32, respectively, when formed radially inwardly by magnetic pulse applied to the band 36. It should be noted that the protrusion 32a is provided on the outermost of the two axle housing components, i.e. the axle housing component which is disposed around or outside the other axle housing component. Thus, if the arm portion 32 is disposed around a portion of the carrier flange 22, then the arm portion is the outermost axle housing component, and the protrusion 32a is formed on the outer surface of the arm portion 32.

Figure 6:
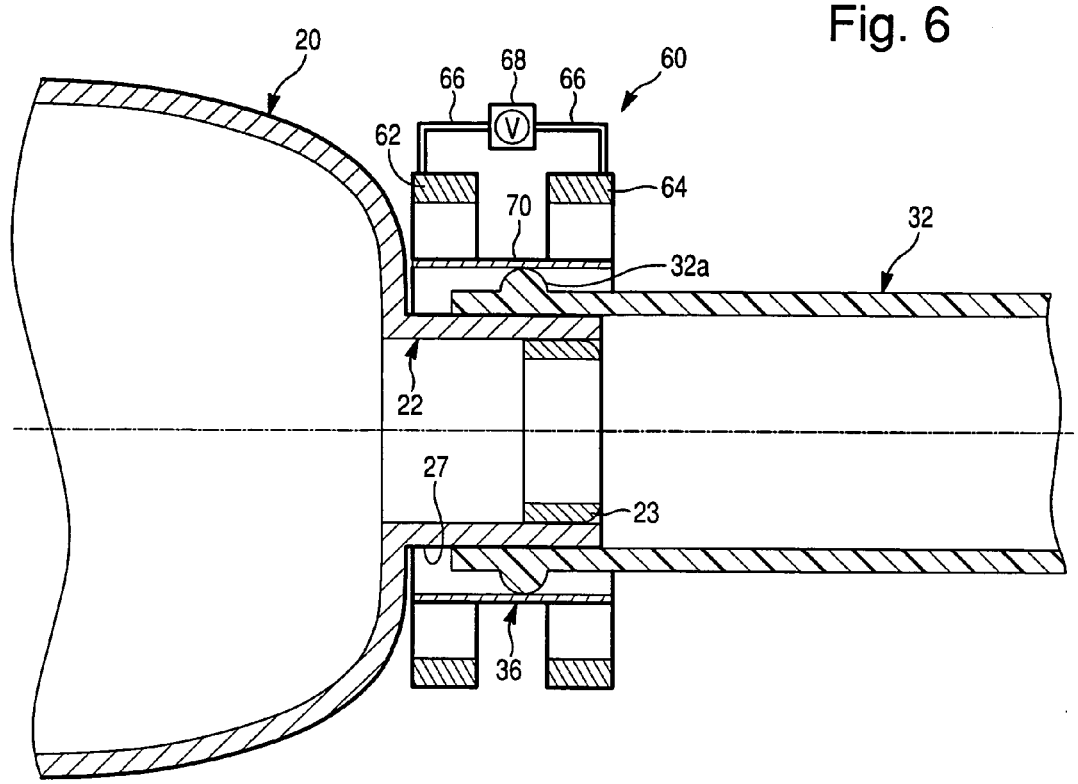
Figure 7:
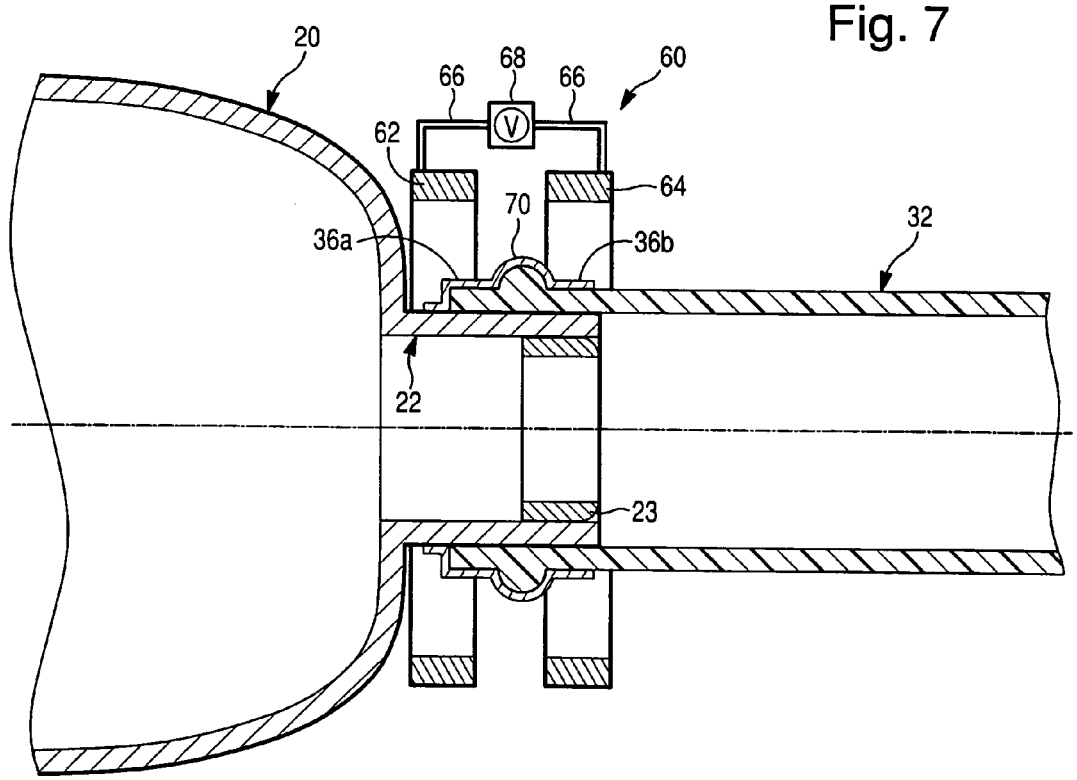

The third step in the method of this invention is illustrated in FIGS. 6 and 7. As shown, a band perimeter reduction device, such as magnetic pulse welding apparatus indicated generally at 60, is disposed around the metallic band 36 and around and adjacent the overlapping portion 33 of the arm portion 32 and flange 27. The electromagnetic pulse apparatus 60 is adapted to generate an intense, momentary magnetic field on a localized portion of the metallic band 36. The intense magnetic field applied at a localized area creates inwardly directed forces which cause the metallic band 36 to collapse inwardly at that area, thereby reducing its size until it intimately contacts the arm portion 32 and is magnetically pulse welded to the flange 27. The contact of the two metallic members at high velocities from appropriately defined initial geometry causes the two metallic members to be welded together.

In the illustrated embodiment, the magnetic pulse welding apparatus 60 includes one or more inductor coils at 62 and 64. The inductor coil of apparatus 60 may involve a single turn, an opening coil comprised of a plurality of circular elements or a coil comprised of a plurality of non-opening elements (not shown) similar to that disclosed in U.S. Pat. No. 4,129,846 to Yablochnikov, which is hereby incorporated by reference. The preferred opening coil provides greater ease of manufacturing in the total assembly of the axle housing.

The magnetic pulse welding apparatus 60 includes leads or terminals 66 that connect a source of power 68 to the inductor coils at 62 and 64. The magnetic pulse welding apparatus 60 includes one or more high voltage capacitors (not shown) and a discharge circuit (not shown) that is suitable for conducting a momentary current of sufficient magnitude. The central components of a magnetic pulse welding apparatus are its capacitor bank, inductor and high current switching device. The current required to successfully deform and weld on a hollow metallic member used in a vehicle axle component, such as the band 36, may exceed one million amps, and will vary with the charge voltage of the power supply of 60, materials selected for components of the axle assembly and band 36 and gauge thickness. The discharge circuit and the capacitors operate to supply an energy spike or surge to the inductor coils 62 and 64. The inductor coils 62 and 64 create a strong magnetic field that exerts a force against the outer surface of the band 36. The effect of the intense, momentary magnetic field on the metallic band 36 is to create an extremely powerful force that repels or drives band 36 radially inwardly away from the inductor coils 62 and 64. The magnetic field created by the pulse of current through the inductor coil 62 and 64 creates strong reactive eddy currents in the metallic band 36. The eddy currents create opposing magnetic fields that result in inwardly directed forces on the metallic band 36. These forces cause the band 36 to collapse about a localized area, reducing its size until it contacts the flange 27, the protrusion 32a, and the arm portion 32, thereby welding and also crimping or clinching the band 36.

The amount that the metallic band 36 is reduced in size is determined by the shape of the inductor coils 62 and 64, the developed geometry of the band 36 relative to flange 27 and portion 32 and the strength of the electromagnetic field. These factors affect the velocity of the metallic band as it is reduced in size. In the illustrated embodiment, the coil 62 disposed around the portion of the metallic band 36 located above the flange 27 is preferably adapted to both reduce the size of the band 36 until it contacts the metal flange 27 and to weld the band 34 and/or 36 to the flange 27. In contrast, the coil 64 disposed around the portion of the metallic band 36 located above the non-metallic arm portion 32 is preferably adapted to only reduce the size of the band until it contacts the arm portion 32, thereby crimping or clinching the metallic band around the protrusion 32a. As can be seen in FIG. 7, one part of the band 36, i.e., edge portion 36a, is welded to the flange 27, whereas the other part of the band 36, the edge portion 36b, is attached to the arm portion 32 by crimping or clinching the band around the protrusion 32a.

Alternatively, a multi turn coil, not shown, is provided for the magnetic pulse welding step. This multi turn coil is adapted to provide electromagnetic fields of variable strengths across the width of the band 36. In this embodiment, the multi turn coil is used to discretely reduce or crimp the various portions of the metallic band, such as section 36a located adjacent the flange 27, central section 70 located above the protrusion 32a, and section 36b located adjacent the arm portion 32.

As shown in FIG. 7, the magnetic pulse welding apparatus 60 is operated so that the coils 62 and 64 each create an electromagnetic field which causes the metallic band 36 to be reduced in size around the flange 27, the protrusion 32a, and the arm portion 32. The coil 62 is operated such that the section of the metallic band 36 is also welded to the flange 27, thereby forming the joint 50b between the arm portion 32 and the carrier portion 20. The reduction of the metallic band portions 36a, 36b on both sides of the protrusion 32a functions as a mechanical lock by crimping or clinching to also secure the arm portion 32 to the flange 27. Although the protrusion 32a is shown as an arcuate surface, being somewhat less than a semicircle in cross-sectional profile, it is to be understood that the protrusion can be configured in numerous other shapes, as long as the protrusion can function as a mechanical lock by crimping or clinching to secure the arm portion 32 to the flange 27. The protrusion 32a should have sufficient height and shape to act as an effective locking device for crimping. Preferably the protrusion 32a has a thickness t within the range of from about 70 percent to about 150 percent of the thickness T of the cross member, although the protrusion can have other heights. It is to be understood that although the joint 50a, 50b is illustrated as being formed in part by mechanical crimping or clinching of the edge portion 36a of the band 36 to the arm portion 32, the bond can be effected or enhanced by the use of adhesive, with or without the use of crimping or clinching.

The foregoing method and process has been shown and described with reference to the carrier portion 20 and the arm portion 32; however, the same principles and process can be applied to both arm portions 32, 32 as well as the joints 52a, 52b between the arm portions and respective wheels spindles 40, 42. Additionally, the process and associated structure related to the pulse weld method described above may be varied and adapted to suit the structure being joined. To that end, applicant hereby incorporates by reference to U.S. Pat. No. 5,966,813.

A third exemplary embodiment of the method of joining of the axle components is shown in FIGS. 8–11. Components, which are unchanged from, or function in the same way as in the first exemplary embodiment depicted in FIGS. 1–3 are labeled with the same reference numerals, sometimes without describing detail since similarities between the corresponding parts in the two embodiments will be readily perceived by the reader.

In the third exemplary embodiment of this invention, the axle housing members to be joined are both made from different metallic materials. For example, the center carrier portion 20 can be formed from aluminum or steel, the arm portions 30, 32 can be formed from aluminum, and the wheel spindles can be formed from steel. It is also envisioned that one of the two vehicle axle housing components, for example one of the carrier portion 20 or the arm portions 30, 32 to be joined together at a joint is made from a non-metallic material, while the other component is made from a metallic material. Thus, the illustrated joints 50a, 50b connect a metallic axle component to a non-metallic component. However, the method of this invention is equally suitable to form a joint 50a, 50b between two axle components made from any two dissimilar materials, even where the two dissimilar materials are generally not joinable by conventional techniques. As such, the inventive method may be used to join two axle components made from dissimilar metals or to join two axle components made from one metallic material and another, different non-metallic (or non-weldable) material.

Figure 8:
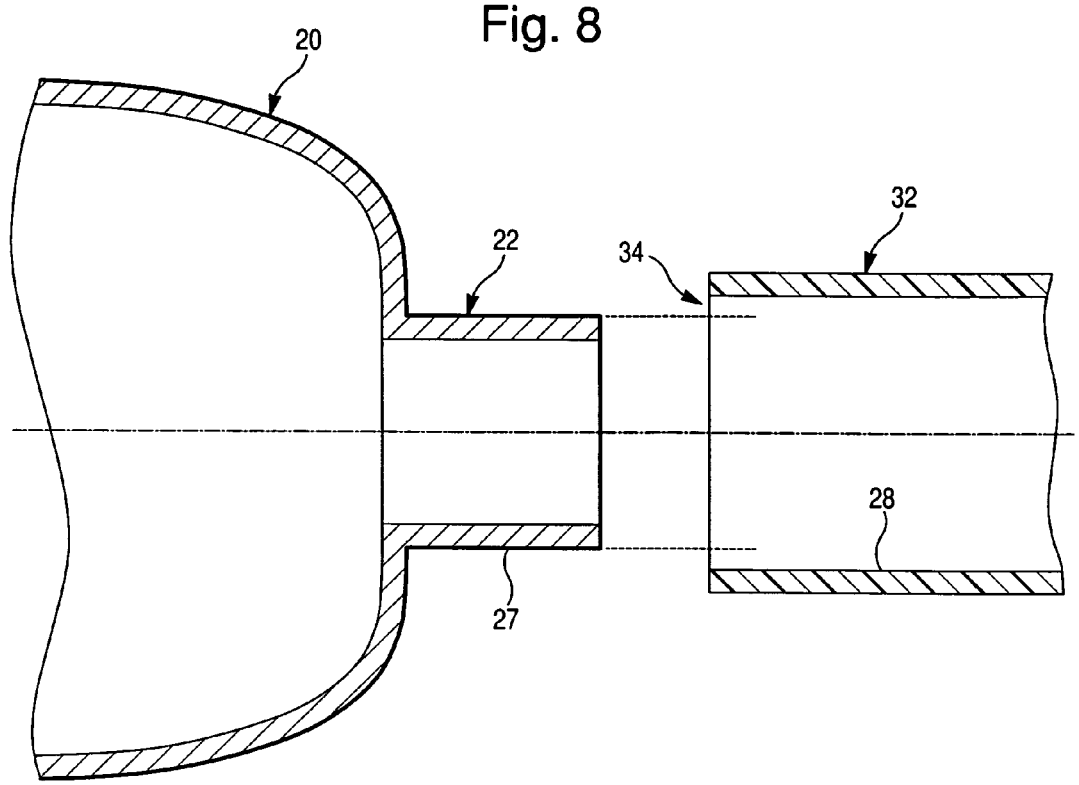
FIGS. 8 and 9 are enlarged cross-sectional views in elevation of a portion of the vehicle axle assembly illustrated in FIG. 1 sequentially illustrating the steps in a third exemplary embodiment of the method for securing axle components in accordance with this invention.

In a first step of the method shown in FIG. 8, a metallic or non-metallic carrier member 20 and a metallic arm portion 32 are provided. In the illustrated embodiment, both the carrier member 20 and the arm portion 32 are shown as closed channel structures, although such is not required. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an aramid/glass/carbon composite), or combinations thereof. Other non-metallic materials include reinforced inorganic composite materials and laminate materials. For purposes of this invention, all of these non-metallic materials are referred to as "composite materials".

The carrier portion 20 includes a flange 22 or other portion which extends from the carrier 20 at a location where it is desired to attach the arm portion 32. The flange 22 is adapted to be received within a portion of the arm portion, such as open end 34. The cross sectional shape of the flange 22 should be compatible with the cross sectional shape of the arm portion 32 of sufficient geometry to permit a magnetic pulse in the configuration where generally conductive materials are involved. Further, the perimeter of the outer surface 27 of the flange 22 is smaller than the perimeter of the inner surface 28 of the arm portion 32 so that the arm portion 32 will be supported on the 22 flange of portion 27 after the magnetic pulse crimping. In a preferred embodiment, both the flange 22 and the arm portion 32 have a generally tubular rectangular or otherwise continuous cross section.

Figure 10:
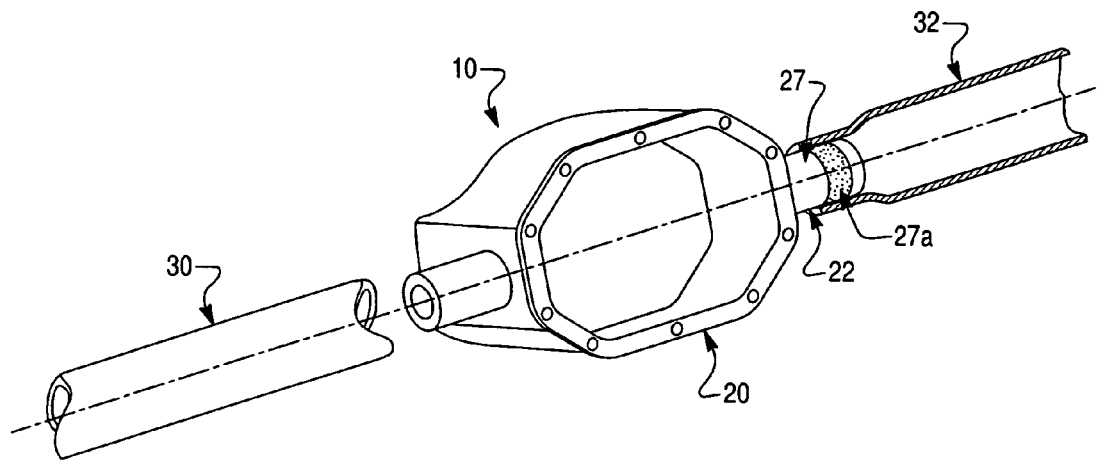
FIG. 10 is partial perspective view the vehicle axle housing manufactured in accordance with the method of the third exemplary embodiment this invention.
Figure 13:
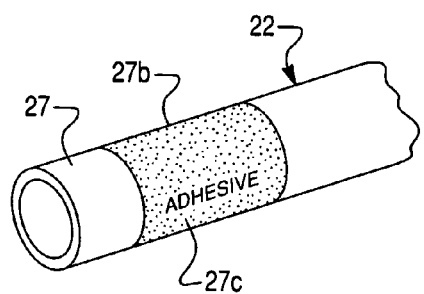
FIG. 13 is a partial perspective view the vehicle axle housing showing a torque resistant section provided on a flange of a central carrier portion.

Optionally, the outer surface 27 of the flange 22 may include a torque resistant section 27a provided to resist relative rotation (torsional load) between the flange 22 and the arm portion 32. The torque resistant section 27a may be in any appropriate form, such as serrated teeth as illustrated in FIG. 10, or provided with a plurality of transverse spline teeth 27b, as illustrated in FIGS. 11A and 11B showing the axle components before crimping operation. Alternatively, the torque resistant section 27a may have a torque-resistant cross-section, such as square, hexagonal, etc. The torque resistant section 27a is provided to enhance friction bonding between the flange 22 and the arm portion 32 after the magnetic pulse crimping. Further alternatively, as illustrated in FIG. 13, the torque resistant section 27a may be in the form of an annular recess 27b provided with an adhesive material 27c to enhance friction bonding between the flange 22 and the arm portion 32 with the adhesive bonding after the magnetic pulse crimping. The annular recess 27b is formed or machined on the outer surface 27 of the flange 22. A thickness of the annular recess 27b is such so as to establish a bond line that places the adhesive material 27c in its strongest sheer mode.

Figure 9:
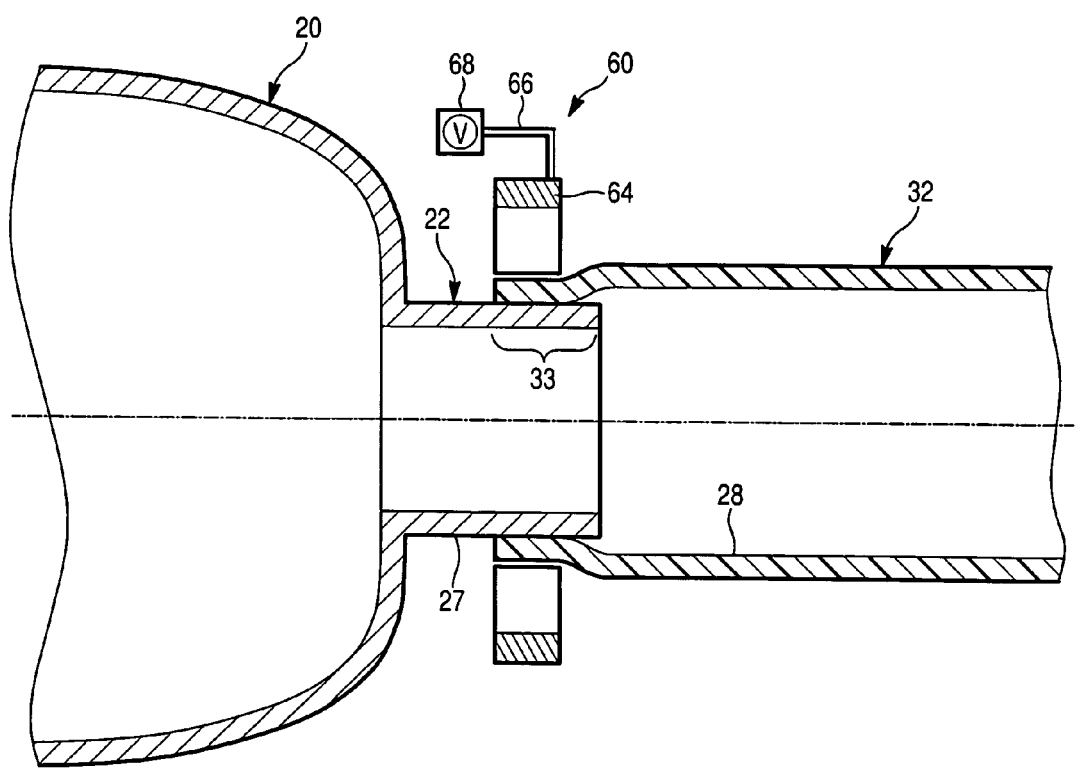

The second step in the method according to the third exemplary embodiment of this invention, as illustrated in FIG. 9, is to position the open end 34 of the arm portion 32 around the flange 22 such that a portion of the inner surface 28 of the arm portion 32 overlaps and contacts a portion of the outer surface 27 of the flange 22. The overlapping portion is indicated at 33. Alternatively, if the flange 22 of the carrier 20 is made of metallic material, the flange 22 may be positioned around the arm portion 32.

In some light axle applications (i.e., gauge of material is less than 2.5 mm), a removable solid mandrel 123 might be used to provide the rigidity and stiffness necessary for a successful magnetic pulse crimping process. The mandrel 123 is closely engages the inner peripheral surface of the outer supported component, i.e. the flange 22, but does not have to be welded. The mandrel 123 is provided to prevent the torque resistant section (such as splined section in FIGS. 11A and 11B) 27a from collapsing during the crimping operation.

The third step in the method of this invention is illustrated in FIG. 9. As shown, a perimeter reduction device, such as magnetic pulse welding apparatus indicated generally at 60, is disposed around and adjacent the overlapping portion 33 of the arm portion 32 and flange 22. The magnetic pulse welding apparatus 60 includes leads or terminals 66 that connect a source of power 68 to the inductor coil 64. The magnetic pulse apparatus 60 is adapted to generate an intense, momentary magnetic field on a localized portion of the overlapping portion 33. The intense magnetic field applied at a localized area creates inwardly directed forces which cause the arm portion 32 to collapse inwardly at that area, thereby reducing its size until it intimately contacts the flange 22 and is magnetically pulse crimped to the flange 22. The contact of the two members at high velocities from appropriately defined initial geometry causes the two members to be crimped together, although not metallurgically bonded. By contrast with the first exemplary embodiment of the present invention, in the method of the third exemplary embodiment, the momentary magnetic field is generated by the magnetic pulse apparatus 60 in response to lower voltage that creates lower inwardly directed forces on the overlapping portion 33 of the arm portion 32. These forces are sufficient to cause the overlapping portion 33 of the arm portion 32 to collapse about a localized area, reducing its size until it contacts the outer surface 27 of the flange 22, thereby crimping or clinching the arm portion 32 around the flange 22 of the carrier portion 20, but not sufficient to create metallurgic bond therebetween. Thus, the arm portion 32 to is securely joined to the flange 22 of the carrier portion 20. If the solid mandrel 123 was employed to prevent the splined section 27a from collapsing, the solid mandrel 123 is removed after the crimping operation.

FIGS. 12A and 12B illustrate the flange 22 to the arm portion 32 connection after crimping operation in case when the torque resistant section 27a is provided with the plurality of the transverse spline teeth 27b.

A fourth exemplary embodiment of the method of joining of the axle components is shown in FIG. 14. Components, which are unchanged from, or function in the same way as in the second exemplary embodiment depicted in FIGS. 4–7 are labeled with the same reference numerals, sometimes without describing detail since similarities between the corresponding parts in the two embodiments will be readily perceived by the reader.

In a first step of the method shown in FIG. 14, a metallic carrier member 20 and a non-metallic arm portion 32 are provided. In the illustrated embodiment, both the carrier member 20 and the arm portion 32 are shown as closed channel structures, although such is not required. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The carrier portion 20 includes a flange 22 or other portion which extends from the carrier 20 at a location where it is desired to attach the arm portion 30, 32. In some light axle applications (i.e., gauge of material is less than 2.5 mm), an insert might be used to provide the rigidity and stiffness necessary for a successful magnetic pulse welding process. The insert, if required, must be intimate with the outer supported component but does not have to be welded. The flange 22 is adapted to be received within a portion of the arm portion, such as open end 24. The cross sectional shape of the flange 22 should be compatible with the cross sectional shape of the arm portion 32 of sufficient geometry to permit a magnetic pulse crimp in the configuration where generally conductive materials are involved.

Preferably, the outer surface 27 of the flange 22 includes a torque resistant section 27a provided to resist relative rotation (torsional load) between the flange 22 and the arm portion 32. The torque resistant section 27a may be in any appropriate form, such as serrated teeth as illustrated in FIG. 14, or provided with a plurality of transverse spline teeth. Alternatively, the torque resistant section 27a may have a torque-resistant cross-section, such as square, hexagonal, etc. The torque resistant section 27a is provided to enhance friction bonding between the flange 22 and the arm portion 32 after the magnetic pulse crimping. Further, when the material of the outer component is composite, the perimeter of the outer surface 27 of the flange 22 will be only slightly smaller than the perimeter of the inner surface 28 of the arm portion 32 so that the cross member composite material will be supported on the 22 flange of portion 27 during and after the magnetic pulse welding. In a preferred embodiment, both the flange 22 and the arm portion 32 have a generally tubular rectangular or otherwise continuous cross section with the plurality of the serrations formed on the outer surface 27 of the flange 22.

The second step in the method of this invention, as illustrated in FIG. 14, is to position the open end 34 of the arm portion 32 on the flange 22 preferably by a press-fit connection such that the inner surface of the arm portion 32 overlaps and contacts the outer surface 27 of the flange 22. Next, a metallic band 36 is disposed completely around the overlapping portions of the arm portion 32 and the flange 27. The metallic band 36 is a continuous, annular-shaped member of good electrically conductive material, such as but not restricted to aluminum.

The third step in the method of this invention a band perimeter reduction device, such as magnetic pulse welding apparatus, is disposed around the metallic band 36 and around and adjacent the overlapping portion of the arm portion 32 and flange 22. The magnetic pulse apparatus generates an intense, momentary magnetic field on a localized portion of the metallic band 36. The intense magnetic field applied at a localized area creates inwardly directed forces which cause the metallic band 36 to collapse inwardly at that area, thereby reducing its size until it intimately contacts the arm portion 32 and crimps the arm portion 32 around the flange 22 of the carrier portion 20, but not sufficient to create metallurgic bond therebetween. Thus, the arm portion 32 to is securely joined to the flange 22 of the carrier portion 20.

Figure 15:
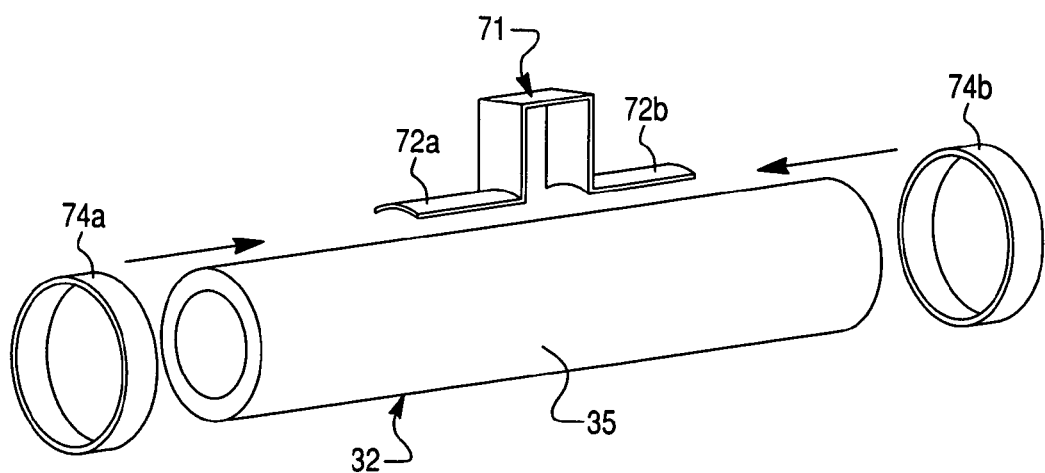
FIGS. 15 and 16 sequentially illustrate the steps in a fourth exemplary embodiment of the method for securing axle components in accordance with this invention.
Figure 16:
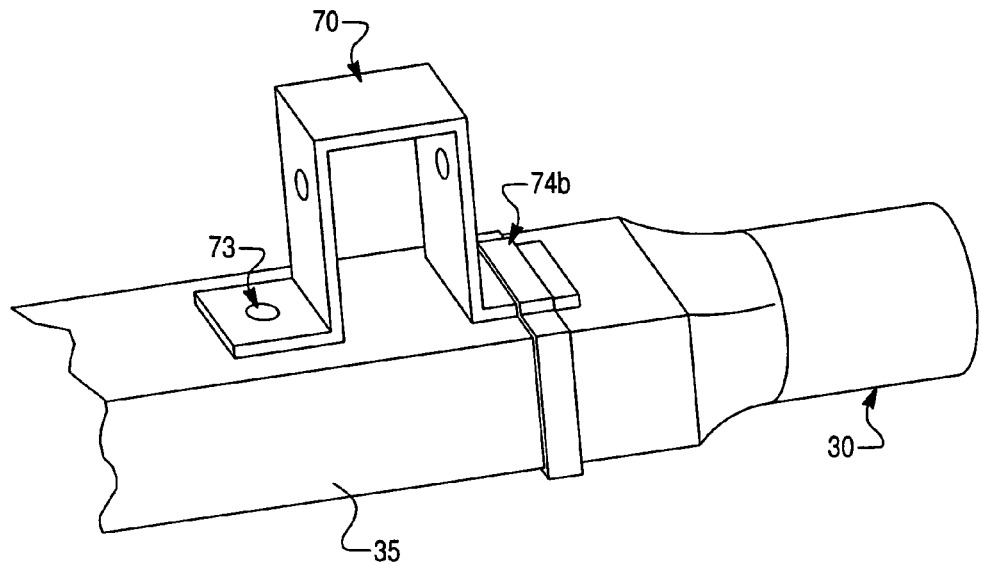
Figure 17:
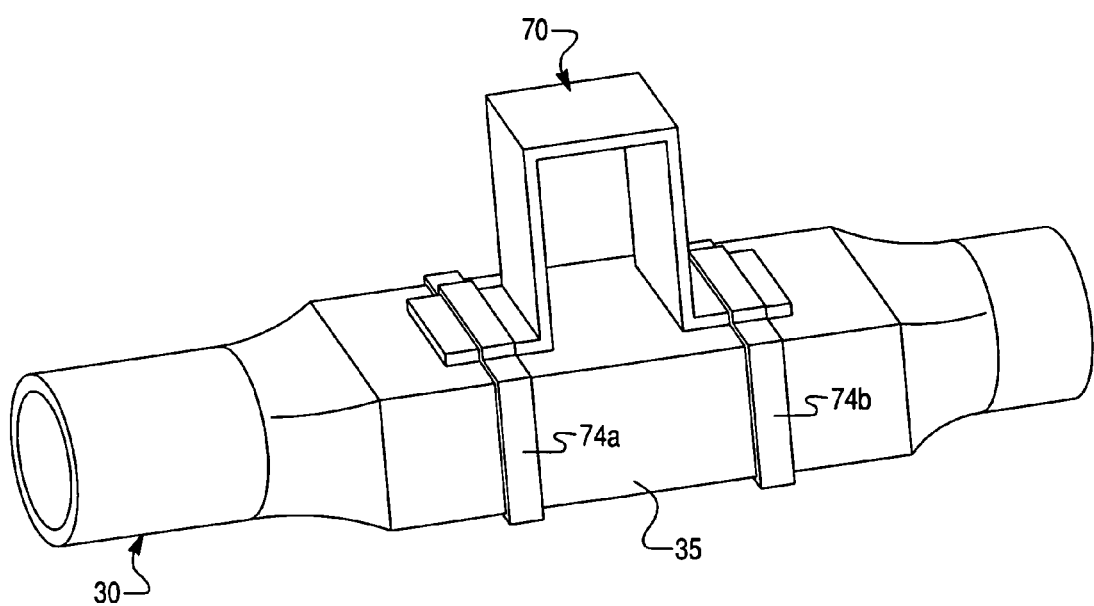
FIG. 17 is a partial perspective view the vehicle axle housing showing a mounting bracket securely joined to an arm portion of the axle housing by the method of the fourth exemplary embodiment this invention.

A fifth exemplary embodiment of the method of joining of the axle components is shown in FIGS. 15–17. More specifically, the method according to the fifth exemplary embodiment of the present invention is directed to the method of joining a mounting bracket 71 to the arm portion 32 of the axle housing 10 for mounting chassis components, such as a shock absorber. The fifth exemplary embodiment of the method of this invention is suitable to join the mounting bracket 71 to the arm portion 32 made from any two dissimilar materials, even where the two dissimilar materials are generally not joinable by conventional techniques.

In a first step of the method shown in FIG. 15, the arm portion 32, the mounting bracket 71 and a pair of metallic bands 74a and 74b are provided. The mounting bracket 71 has a pair of support legs 72a and 72b extending in opposite directions along the arm portion 32. In the fifth exemplary embodiment of this invention, the arm portion 32 and the bracket 71 to be joined may be made from similar or different metallic materials or from the non-metallic material. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an aramid/glass/carbon composite), or combinations thereof. Other non-metallic materials include reinforced inorganic composite materials and laminate materials. For purposes of this invention, all of these non-metallic materials are referred to as "composite materials". Preferably, the arm portion 32 is formed from the metallic material, such as aluminum or steel, while the bracket 71 is formed from the non-metallic material. The metallic bands 74a and 74b are made of the material, such as aluminum or steel.

The second step in the method according to the fifth exemplary embodiment of this invention is to position the bracket 71 in a proper place on the arm portion 32. Preferably, the support legs 72a and 72b of the bracket 71 are spot welded to the arm portion 32, as shown at 73 in FIG. 16, to fix the bracket 71 in this position. Then, the metallic bands 74a and 74b are positioned around the arm portion 32 so as to overlap the support legs 72a and 72b of the bracket 71.

Optionally, the arm portion 32 under the support legs 72a and 72b of the bracket 71 may include a torque resistant section 35 provided to resist relative rotation (torsional load) between the bracket 71 and the arm portion 32. The torque resistant section 27a may be in any appropriate form, such as serrated or provided with a plurality of transverse splines. Preferably, the torque resistant section 35 has a torque-resistant cross-section, such as square (as shown in FIG. 16, hexagonal, etc. The torque resistant section 35 is provided to enhance friction bonding between the bracket 71 and the arm portion 32 after the magnetic pulse crimping. Any appropriate process known in the art may form the torque-resistant cross-section of the torque resistant section 35. Preferably, the square cross-section of the torque resistant section 35 is formed from the tubular arm portion 32 shown in FIG. 15 by hydroforming. Alternatively, the cross-section of the torque resistant section 35 may be formed from round stock by pulse forming, push pointing, etc.

In the third step in the method of this invention, a perimeter reduction device, such as magnetic pulse welding apparatus 60 shown and described in the third exemplary embodiment of the present invention, is disposed around and adjacent the metallic bands 74a and 74b. Then, the magnetic pulse apparatus 60 generates an intense, momentary magnetic field on a localized portion of the metallic bands 74a and 74b. The intense magnetic field applied at a localized area creates inwardly directed forces which cause the metallic bands 74a and 74b to collapse inwardly, thereby reducing their size until they intimately contact the support legs 72a and 72b of the bracket 71 and the arm portion 32 and is magnetically pulse crimped to the portion 32. The contact of the metallic bands 74a, 74b and the support legs 72a, 72b of the bracket 71 and the arm portion 32 at high velocities from appropriately defined initial geometry causes these members to be crimped together, although not metallurgically bonded. As in the third exemplary embodiment of the present invention, in the method of the fifth exemplary embodiment, the momentary magnetic field is generated by the magnetic pulse apparatus 60 in response to lower voltage that creates lower inwardly directed forces on the o metallic bands 74a and 74b. These forces are sufficient to cause the metallic bands 74a and 74b to collapse about a localized area, reducing its size until it contacts the support legs 72a, 72b of the bracket 71 and the arm portion 32, thereby crimping or clinching the metallic bands 74a and 74b around the support legs 72a, 72b of the bracket 71 and the arm portion 32 (as shown in FIG. 16), but not sufficient to create metallurgic bond therebetween. Thus, the mounting bracket 71 to is securely joined to the arm portion 32 of the axle housing 10, as illustrated in FIG. 17.

The principle and mode of operation of this invention have been described in its preferred embodiments. However, it should be noted that this invention may be practiced otherwise than as specifically illustrated and described without departing from its scope.

What is claimed is:

1. A method of joining two vehicle axle housing components, the method comprising the steps of:
   a. providing a first axle component disposed about a rotatable axle member;
   b. providing a second axle component, wherein at least one of the first and second axle components is made from a metallic material;
   c. positioning at least one portion of one of the first and second axle components on at least one portion of another one of the first and second axle components in an overlapping manner, thereby forming at least one overlapping portion;
   d. providing an inductor around the at least one overlapping portion;
   e. energizing the inductor to generate a magnetic field and to magnetic pulse crimp the metallic material, thereby securing the first and second axle components together.

2. The method of joining two vehicle axle housing components as defined in claim 1, wherein the step of energizing the inductor further magnetic pulse welds the metallic material.

3. The method of joining two vehicle axle housing components as defined in claim 1, wherein the step of energizing the inductor magnetic pulse crimps the metallic material without magnetic pulse welding thereof.

4. The method of joining two vehicle axle housing components as defined in claim 1, further including the steps of providing at least one retaining collar made from a metallic material, and positioning the at least one retaining collar around the at least one overlapping portion.

5. The method of joining two vehicle axle housing components as defined in claim 4, wherein the step of energizing the inductor generates the magnetic field for collapsing the at least one metallic band about the at least one overlapping portion and to magnetically pulse crimp the at least one metallic band to the overlapping portion, thereby securing the first and second axle components together.

6. The method of joining two vehicle axle housing components as defined in claim 5, wherein the step of energizing the inductor further magnetic pulse welds the at least one metallic band.

7. The method of joining two vehicle axle housing components as defined in claim 5, wherein the step of energizing the inductor magnetic pulse crimps the at least one metallic band without magnetic pulse welding thereof.

8. The method of joining two vehicle axle housing components as defined in claim 1, wherein both the first and second components are dissimilar metallic components.

9. The method of joining two vehicle axle housing components as defined in claim 8, wherein the step of energizing the inductor further magnetic pulse welds the metallic components.

10. The method of joining two vehicle axle housing components as defined in claim 9, wherein the step of energizing the inductor magnetic pulse crimps the metallic components without magnetic pulse welding thereof.

11. A method of joining two vehicle axle housing components made from similar and/or dissimilar materials, the method comprising the steps of:
   a. providing a first axle housing component;
   b. providing a second axle housing component, wherein at least one of the first and second axle housing components is made from a metallic material;
   c. positioning a portion of the first axle housing component within a portion of the second axle housing component in an overlapping manner, thereby forming an overlapping portion;
   d. providing an inductor around the overlapping;
   e. energizing the inductor to generate a magnetic field and to magnetic pulse crimp the metallic material, thereby securing the first and second axle housing components together,
   wherein the first component is an arm portion for receiving an axle driven by a differential assembly and the second component is a carrier portion for housing the differential assembly.

12. The method of joining two vehicle axle housing components as defined in claim 11, wherein the carrier portion is made of a metallic material and the arm portion is made of a composite material.

13. The method of joining two vehicle axle housing components as defined in claim 12, wherein a section of the carrier portion is positioned within a portion of the arm portion to form the overlapping portion.

14. The method of joining two vehicle axle housing components as defined in claim 11, wherein the step of energizing the inductor further magnetic pulse welds the metallic material.

15. The method of joining two vehicle axle housing components as defined in claim 11, wherein the step of energizing the inductor magnetic pulse crimps the metallic material without magnetic pulse welding thereof.

16. A method of joining two vehicle axle housing components made from similar and/or dissimilar materials, the method comprising the steps of:
   a. providing a first axle housing component;
   b. providing a second axle housing component, wherein at least one of the first and second axle housing components is made from a metallic material;
   c. positioning a portion of the first axle housing component within a portion of the second axle housing component in an overlapping manner, thereby forming an overlapping portion;
   d. providing an inductor around the overlapping;
   e. energizing the inductor to generate a magnetic field and to magnetic pulse crimp the metallic material, thereby securing the first and second axle housing components together,
   wherein the first component is an arm portion for receiving an axle driven by said differential assembly and said second component is a wheel spindle adapted to rotatably support wheels of the vehicle on the axle housing while allowing the axle to extend therethrough to rotatably drive the wheels.

17. The method of joining two vehicle axle housing components as defined in claim 16, wherein the step of energizing the inductor further magnetic pulse welds the metallic material.

18. The method of joining two vehicle axle housing components as defined in claim 16, wherein the step of energizing the inductor magnetic pulse crimps the metallic material without magnetic pulse welding thereof.

19. The method of joining two vehicle axle housing components as defined in claim 16, wherein the arm portion is made of a metallic material and the wheel spindle is made of a composite material.

20. The method of joining two vehicle axle housing components as defined in claim 16, wherein a section of the arm portion is positioned within a section of the wheel spindle to form the overlapping portion.

21. A method of joining two vehicle axle housing components made from similar and/or dissimilar materials, the method comprising the steps of:
   a. providing a first axle housing component;
   b. providing a second axle housing component, wherein at least one of the first and second axle housing components is made from a metallic material;
   c. positioning a portion of the first axle housing component within a portion of the second axle housing component in an overlapping manner, thereby forming an overlapping portion;
   d. providing an inductor around the overlapping;
   e. energizing the inductor to generate a magnetic field and to magnetic pulse crimp the metallic material, thereby securing the first and second axle housing components together,
   wherein the first component is a carrier portion for housing a differential assembly and the second component is an arm portion for receiving an axle driven by said differential assembly, where a portion of the arm portion is positioned within a portion of the carrier portion to form the overlapping portion.

22. The method of joining two vehicle axle housing components as defined in claim 21, wherein an insert is positioned within the metallic component to provide support for the metallic component during the step of crimping.

23. The method of joining two vehicle axle housing components as defined in claim 22, wherein the step of energizing the inductor further magnetic pulse welds the metallic component.

24. The method of joining two vehicle axle housing components as defined in claim 22, wherein the step of energizing the inductor magnetic pulse crimps the metallic component without magnetic pulse welding thereof.

25. The method of joining two vehicle axle housing components as defined in claim 21, wherein a removable mandrel is positioned within the first axle housing component to provide support for the metallic component during the step of crimping.

26. A method of joining two vehicle axle housing components made from similar and/or dissimilar materials, the method comprising the steps of:
   a. providing a first axle housing component made from a metallic material;
   b. providing a second axle housing component made from a composite material,
   c. positioning a portion of the first axle housing component within a portion of the second axle housing component in an overlapping manner, thereby forming an overlapping portion;
   d. disposing a metallic band around the overlapping portion;
   e. providing an inductor around the metallic band; and
   f. energizing the inductor to generate a magnetic field for collapsing the metallic band about the overlapping portion and magnetic pulse welding the metallic band to the metallic component, thereby securing the first and second axle housing components together,
wherein the first component is a carrier for housing a differential assembly and the second component is an arm portion for receiving an axle driven by said differential assembly.

27. The method of joining two vehicle axle housing components as defined in claim 26, wherein the step of energizing the inductor further magnetic pulse welds the metallic band to the first axle housing.

28. The method of joining two vehicle axle housing components as defined in claim 26, wherein the step of energizing the inductor magnetic pulse crimps the metallic band without magnetic pulse welding the metallic band to the first axle housing.

29. A method of joining two vehicle axle housing components, the method comprising the steps of:
    a. providing a first axle component housing a rotatable axle member;
    b. providing a second axle component having at least one support portion, wherein at least one of the first and second axle components is made from a metallic material;
    c. providing at least one metallic band;
    d. positioning the at least one support portion of the second axle component on the first axle component in an overlapping manner, thereby forming at least one overlapping portion;
    e. positioning the at least one metallic band around the at least one overlapping portion;
    f. providing an inductor around the at least one overlapping portion;
    g. energizing the inductor to generate a magnetic field and to magnetic pulse crimp the at least one metallic band around the first and second components, thereby securing the first and second components together.

30. The method of joining two vehicle axle housing components as defined in claim 29, wherein the step of energizing the inductor further magnetic pulse welds the metallic band to the first axle component.

31. The method of joining two vehicle axle housing components as defined in claim 29, wherein the step of energizing the inductor magnetic pulse crimps the metallic band without magnetic pulse welding the metallic band to the first axle component.

32. The method of joining two vehicle axle housing components as defined in claim 29, wherein the first component is an arm portion for receiving an axle driven by a differential assembly and the second component is a mounting bracket.

33. The method of joining two vehicle axle housing components as defined in claim 32, wherein the mounting bracket has two support portions and two metallic band are provided to secure the mounting bracket to the arm portion each positioned around one of the support portions of the mounting bracket.

34. The method of joining two vehicle axle housing components as defined in claim 32, wherein the first component includes a torque resistant section provided to resist relative rotation between the first component and the second component.

35. The method of joining two vehicle axle housing components as defined in claim 34, wherein the torque resistant section has a non-circular cross-section.

36. The method of joining two vehicle axle housing components as defined in claim 29, wherein a removable solid mandrel is positioned within the first axle housing component to provide support for the torque resistant section during the step of crimping.

37. A method of joining two vehicle axle housing components, the method comprising the steps of:
    a. providing a first axle component disposed about a rotatable axle member;
    b. providing a second axle component disposed about said rotatable axle member, wherein at least one of the first and second axle components is made from a metallic material;
    c. positioning a portion of one of the first and second axle components made from the metallic material around a portion of another one of the first and second axle components in an overlapping manner, thereby forming an overlapping portion;
    d. providing an inductor around the overlapping;
    e. energizing the inductor to generate a magnetic field and to magnetic pulse crimp the metallic material, thereby securing the first and second axle components together.

38. The method of joining two vehicle axle housing components as defined in claim 37, wherein one of the first component and the second component includes a torque resistant section provided to resist relative rotation between the first component and the second components.

39. The method of joining two vehicle axle housing components as defined in claim 38, wherein the torque resistant section is provided with a plurality of teeth between the first component and the second components.

40. The method of joining two vehicle axle housing components as defined in claim 38, wherein the torque resistant section has a non-circular cross-section.

41. The method of joining two vehicle axle housing components as defined in claim 38, wherein the torque resistant section includes an annular recess provided with an adhesive material to enhance friction bonding between the first component and the second components with an adhesive bonding.

42. The method of joining two vehicle axle housing components as defined in claim 37, wherein both the first and second axle components are made from a metallic material, and wherein the step of energizing the inductor further magnetic pulse welds the first and second axle components.

43. The method of joining two vehicle axle housing components as defined in claim 37, wherein the step of energizing the inductor magnetic pulse crimps the metallic material without magnetic pulse welding thereof.

* * * * *